March 5, 1968

N. LOUTH 3,371,381

APPARATUS FOR MANUFACTURING CORRUGATED OR CONVOLUTED HOSE

Filed March 10, 1965

INVENTOR
Noel Louth
BY
Russell & Moore
ATTORNEYS

March 5, 1968 N. LOUTH 3,371,381
APPARATUS FOR MANUFACTURING CORRUGATED OR CONVOLUTED HOSE
Filed March 10, 1965 7 Sheets-Sheet 2

INVENTOR
Noel Louth
BY
Russell & Moore
ATTORNEYS

March 5, 1968 N. LOUTH 3,371,381
APPARATUS FOR MANUFACTURING CORRUGATED OR CONVOLUTED HOSE
Filed March 10, 1965 7 Sheets-Sheet 3

INVENTOR
Noel Louth
BY
Russell & Moore
ATTORNEYS

INVENTOR
Noel Louth
BY
Russell & Moore
ATTORNEYS

March 5, 1968 N. LOUTH 3,371,381
APPARATUS FOR MANUFACTURING CORRUGATED OR CONVOLUTED HOSE
Filed March 10, 1965 7 Sheets-Sheet 5

INVENTOR
Noel Louth
BY
Russell & Moore
ATTORNEYS

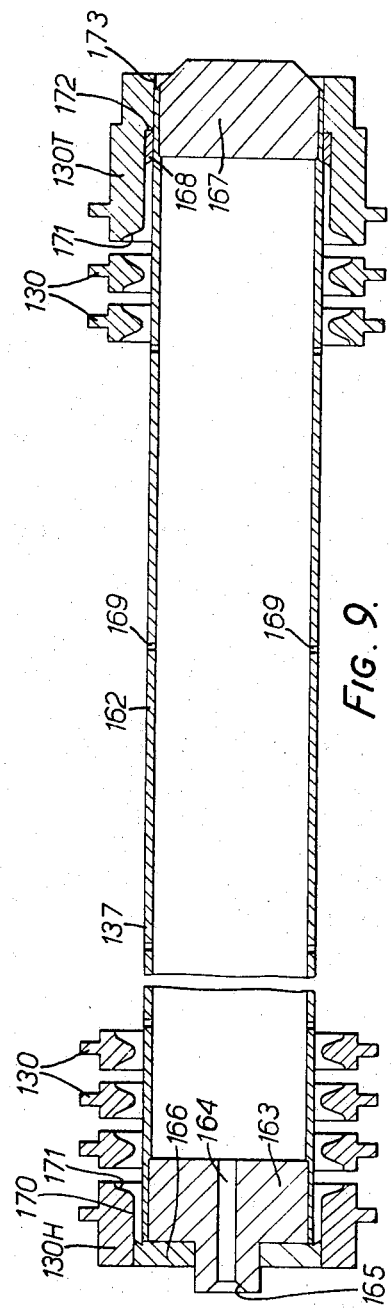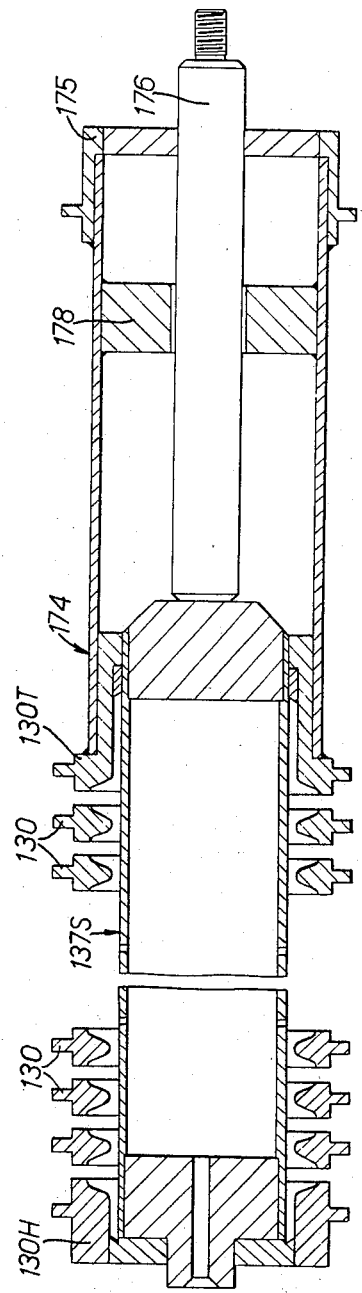

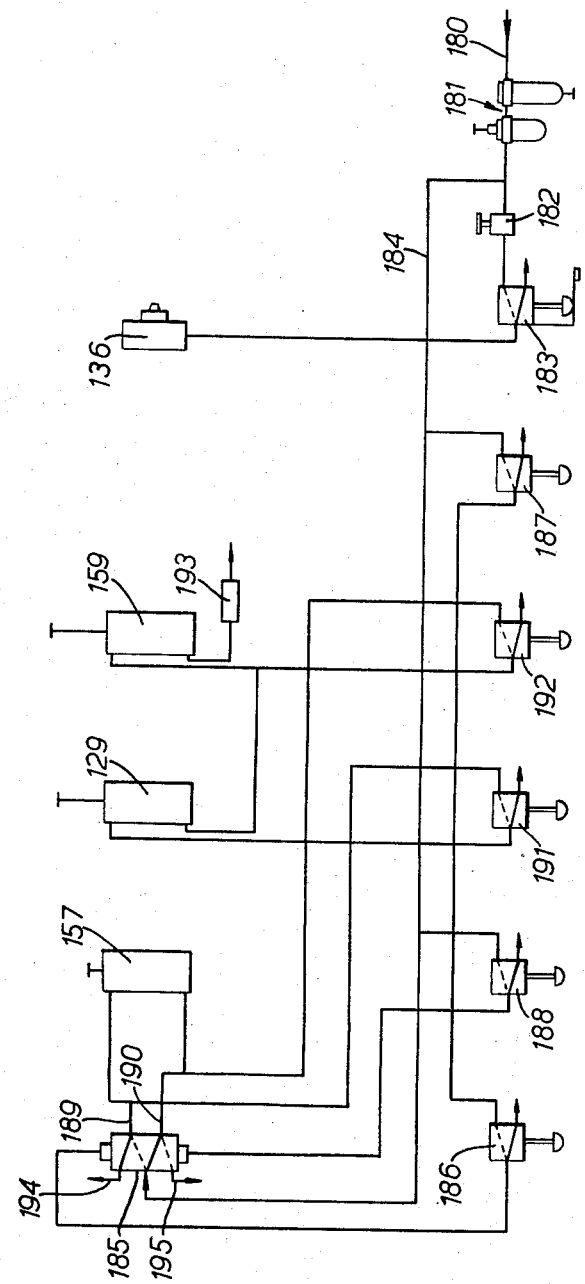

United States Patent Office 3,371,381
Patented Mar. 5, 1968

3,371,381
APPARATUS FOR MANUFACTURING CORRUGATED OR CONVOLUTED HOSE
Noel Louth, Leicester, England, assignor to John Bull Rubber Company Limited, Leicester, England, a British company
Filed Mar. 10, 1965, Ser. No. 438,482
Claims priority, application Great Britain, Mar. 11, 1964, 10,300/64
6 Claims. (Cl. 18—19)

ABSTRACT OF THE DISCLOSURE

An apparatus including means for manufacturing corrugated or convoluted hose of rubber or the like in which the walls of the hose are corrugated so as to present a wavy profile both inside and outside the hose.

---

The present invention concerns improvements relating to the manufacture of corrugated or convoluted hose comprising rubber or the like material in which the wall of the hose is corrugated so as to present a wavy profile both inside and outside the hose. Corrugated hose finds its main use in motor vehicles for making fluid connections between parts on the chassis frame or the like of the vehicle and an engine of the vehicle flexibly mounted on the chassis frame. Corrugated hose has a variety of other uses however. An object of the invention is to provide improved means of manufacture.

The tube is preferably collapsed and shortened on the mandrel only to the extent necessary to produce the required size of corrugations from the circumferential swellings. Preferably also, the tube is vulcanised whilst still on the mandrel on which it is originally supported internally in order to form the corrugations.

The corrugations formed on the tube may be uniformly pitched along at least one portion of the length of the tube intermediate end portions of the tube which are left plain.

The present invention also provides apparatus for manufacturing corrugated hose in accordance with the method defined above, the apparatus comprising a mandrel to internally support a rubber tube blank, abutments on the mandrel to engage respectively the two ends of a tube blank positioned on the mandrel, one of the abutments being movable towards the other, means to support the mandrel, means to restrain around its exterior at spaced transverse planes along its length a rubber tube blank positioned on the supported mandrel, a separate restraining means being provided to restrain the tube at each of said planes and such restraining means being movable axially relative to the mandrel so as to draw closer together, means to advance said movable abutment towards said other abutment, means to supply a differential pressure of fluid between the interior and exterior of a tube blank positioned on the supported mandrel to produce circumferential undulatory swellings in the wall of the tube between the restraining means, and means to hold said movable abutment in an advanced position.

Figure 1:
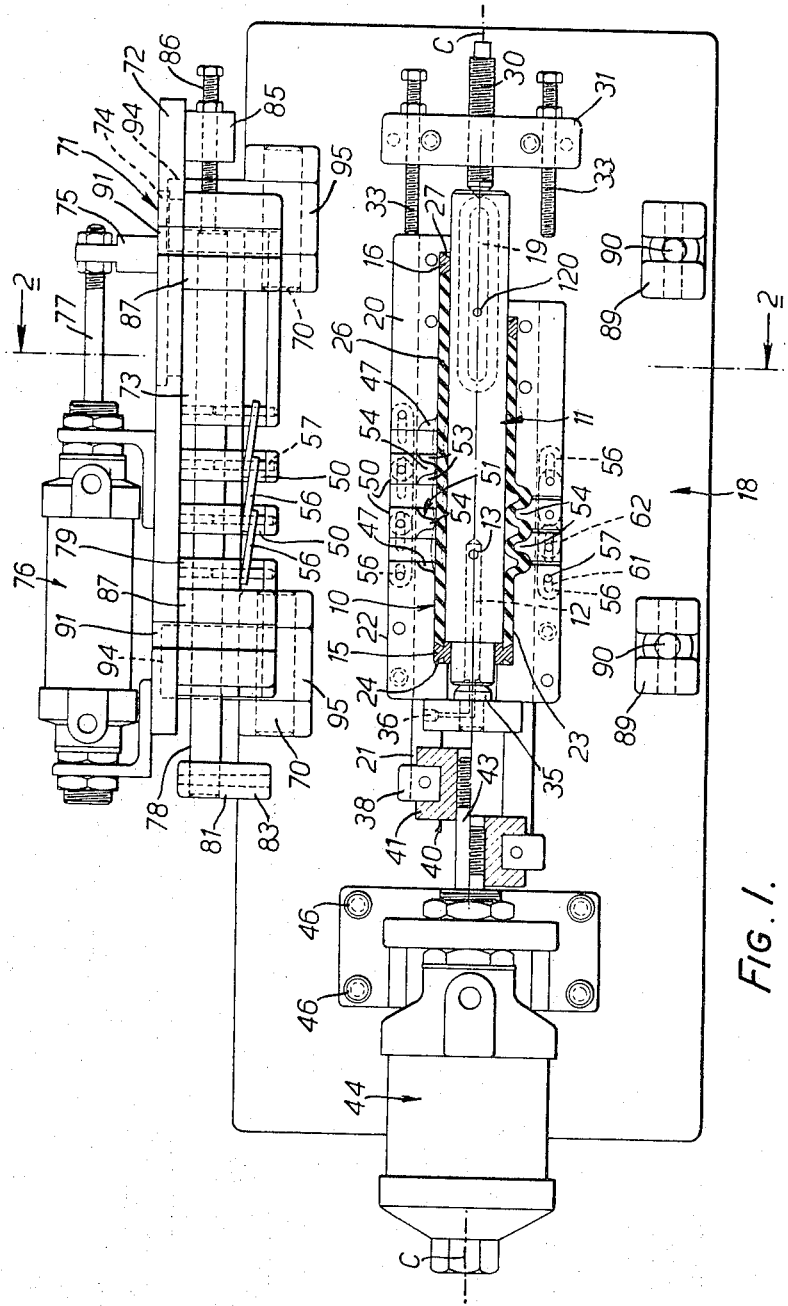
Figure 4:
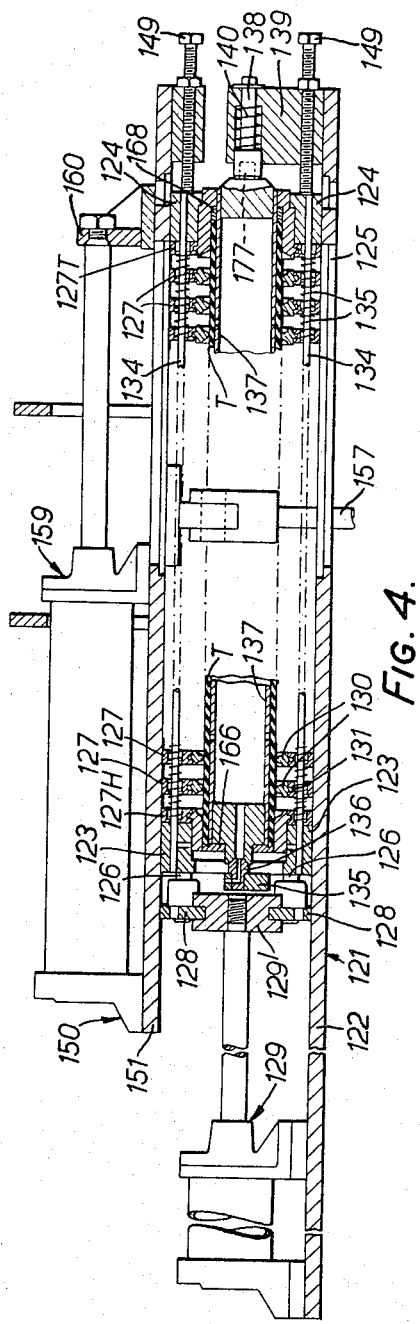
Figure 3:
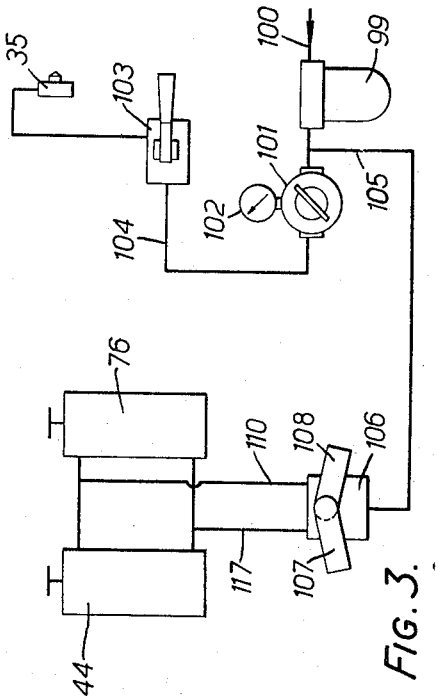
Figure 2:
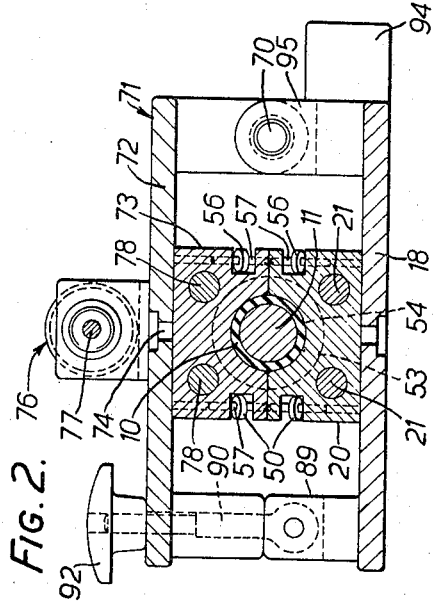
Figure 5:
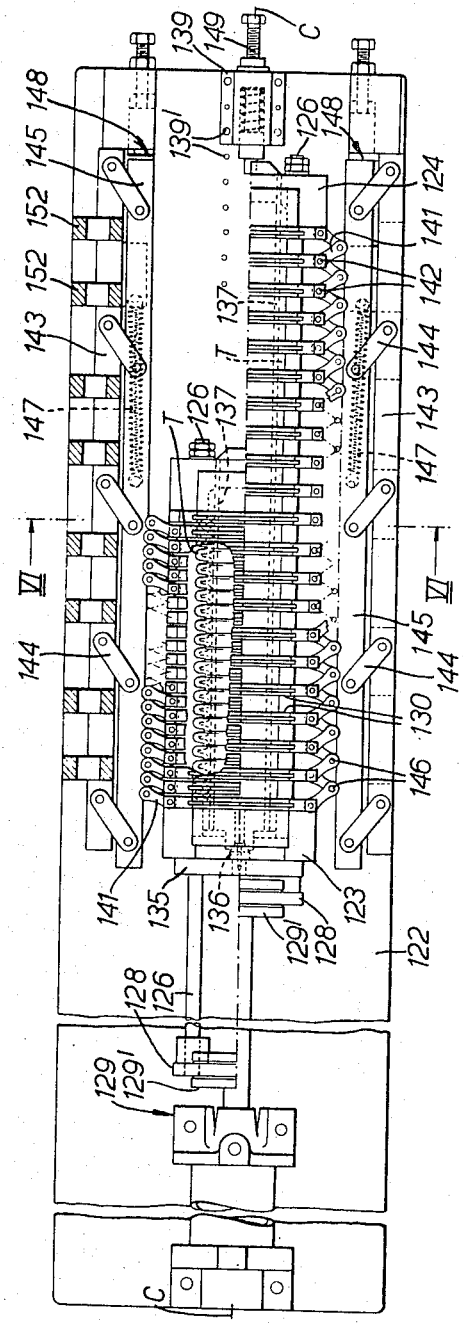
Figure 6:
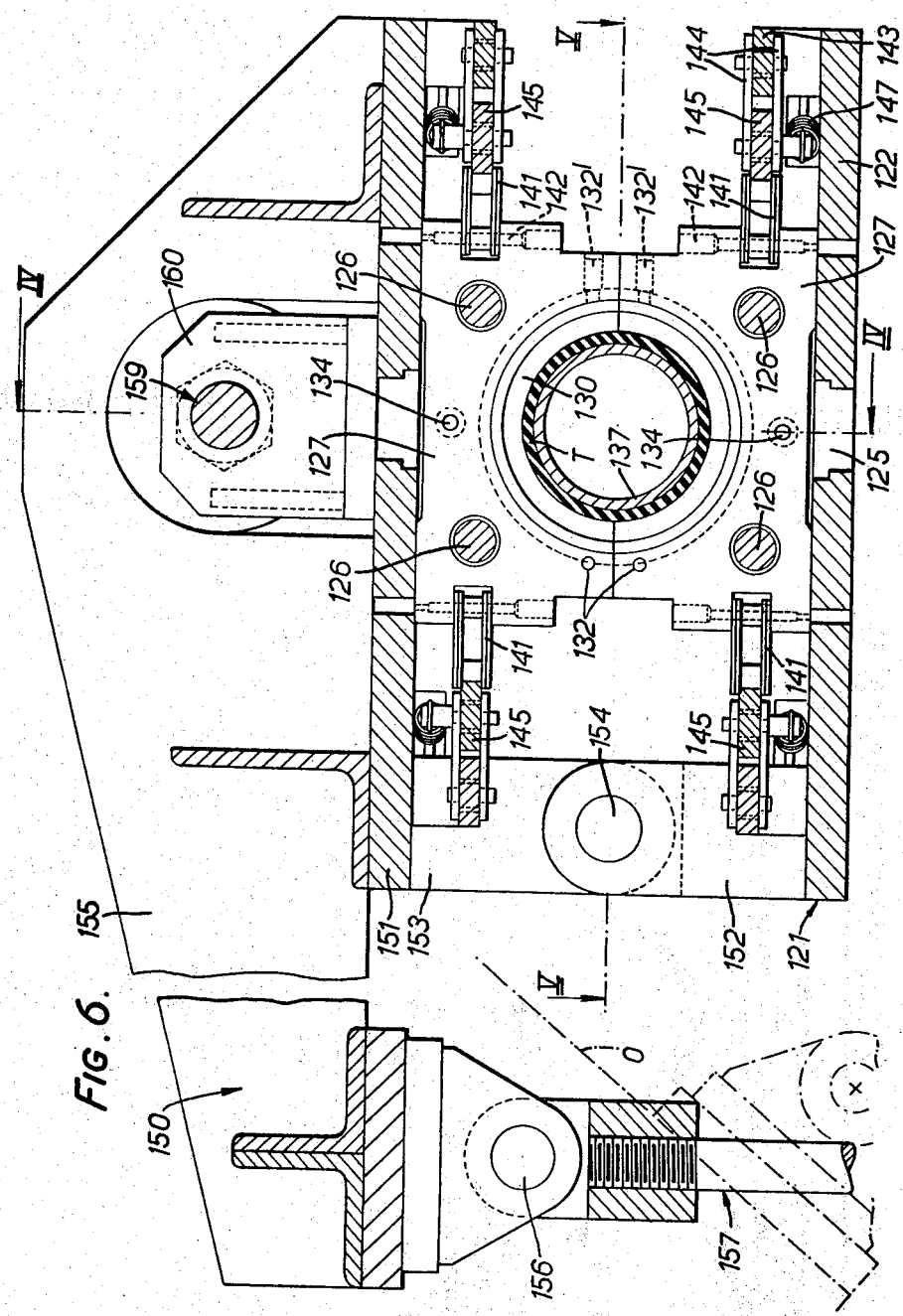
Figures 7, 8:
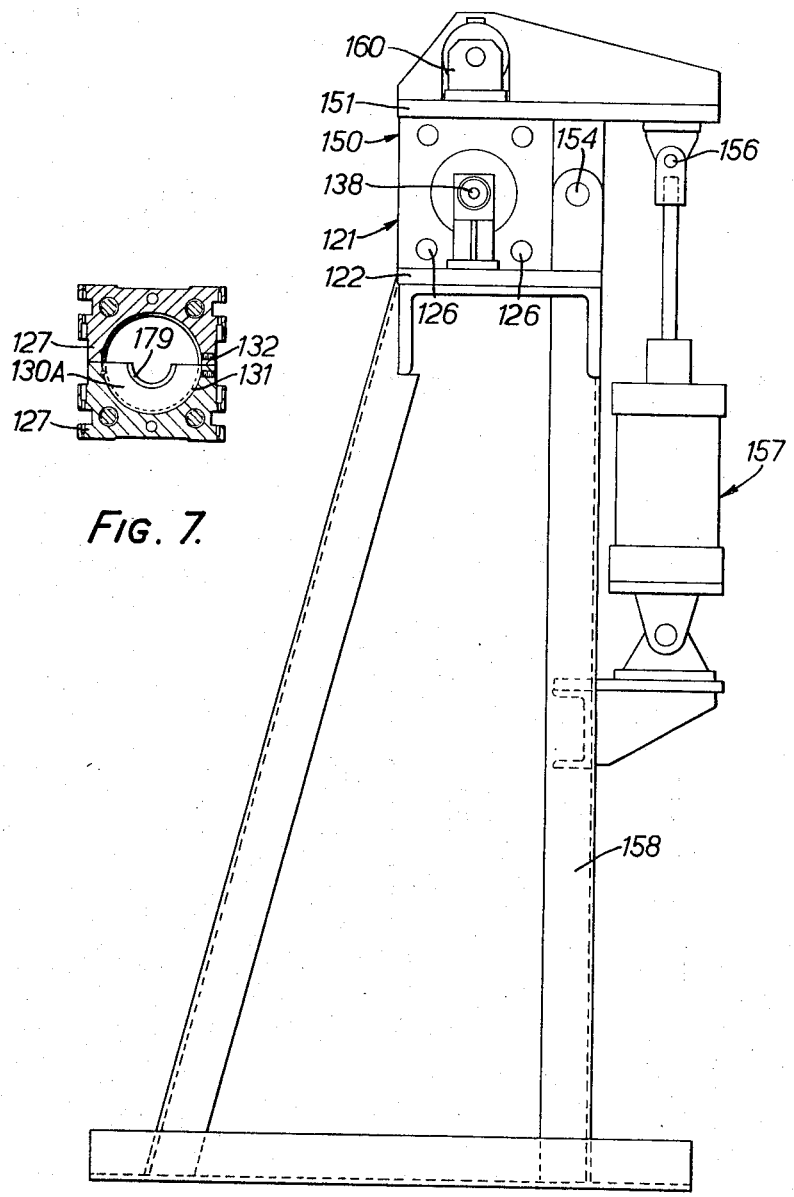

Specific embodiments of the invention will now be described, by way of example, with reference to the accompanying drawings in which:

FIG. 1 is a plan view of one form of apparatus in accordance with the invention showing certain parts in different operative positions but generally, with a top closure assembly of the apparatus in an open position as will hereinafter be explained, FIG. 2 is a section on line 2—2 of FIG. 1 with the top closure assembly of the apparatus closed, FIG. 3 is a diagram showing a compressed air circuit of such apparatus, FIG. 4 is a side elevational view of another form of the apparatus, being sectional view on the line IV—IV of FIG. 6, FIG. 5 is a plan view of the base assembly of such apparatus on the line V—V of FIG. 6, showing certain parts in different operative positions above and below the centre line C—C, FIG. 6 is a transverse sectional view of the apparatus on the line VI—VI of FIG. 5 on an enlarged scale, and indicates a chain line at O an open attitude of a top closure assembly of the apparatus, FIG. 7 corresponds with FIG. 6 and shows a detail of a restraining vane means with an alternative smaller size of vane insert, FIG. 8 is a general end elevation of the apparatus on a reduced scale, FIG. 9 shows to a larger scale a mandrel arrangement for one length of tube as also shown in FIG. 4, FIG. 10 shows another mandrel arrangement for a shorter length of tube, and FIG. 11 shows a penumatic control circuit for such apparatus.

Referring to FIGS. 1 to 3 of the drawings, 10 indicates a length of plain unvulcanised rubber tubing constituting a tube blank from which a piece of corrugated hose is to be formed. The tube blank is positioned on a mandrel 11. The mandrel has an axial bore 12 at one end which communicates with a transverse bore opening through a port 13 to the surface of the mandrel at a location within the tube blank on the mandrel. Adjacent said one end, the mandrel fixedly carries, on a reduced diameter end portion of the mandrel, a fixed abutment collar 15, against which one end of the tube blank abuts. At its other end the tube blank abuts a further abutment collar 16 which is a sliding fit on the mandrel. The mandrel is, in turn, a sliding fit in the tube blank and the mandrel thereby supports the tube blank internally. The tube blank is pushed on to the mandrel, followed by the collar 16. The mandrel is then inserted into the apparatus in the position shown in FIGS. 1 and 2. This will hereinafter be more fully explained. The apparatus comprises a base plate 18 having a T-slot 19 in which is carried a sliding end thrust block 20. The block 20 has fixed thereto one end of a pair of parallel guide rods 21 which slide in bores in an end thrust block 22 at the other end of the apparatus, the block 22 being fixed on the base plate 18. The block 22 has a semi-cylindrical recess 23 which is stepped as at 24, the collar 15 fitting the larger diameter part of this recess and abutting the step. Thus, the block 22 supports the mandrel at one end the reduced diameter end portion of the mandrel lying with clearance within the smaller diameter portion of the recess 23. At its other end, the mandrel lies in a corresponding semi-cylindrical recess 26 in the block 20, the recess 26 being stepped and the collar 16 abutting the step which is indicated at 27. At said other end, the mandrel is additionally supported and located endwise by an adjustable tail stock 30 entered in a countersunk hole in the mandrel end face. The tail stock 30 is screw threaded in a support block 31 fixed on the base plate 18. The block 31 also carries two stop screws 33 for the block 20, the block 20 engaging the screws 33 in its initial position as shown above the centre line C—C in FIG. 1 of the drawings.

Carried on the block 22, adjacent the smaller diameter portion of the recess 23 is an adaptor head having a nozzle 35 which fits in the end of the bore 12 in the mandrel. The nozzle communicates with an air line connection 36 on the adaptor for a purpose hereinafter described.

At their free ends the guide rods 21 carry a thrust plate 38 having a semi-cylindrical recess receiving a thrust collar 40. The collar 40 has flanges 41 one at each end and the thrust plate 38 is a close fit between the flanges. The collar 40 is carried by the piston rod 43 of a double acting compressed air operated ram means 44, the cylinder of which is attached to the base plate 18 as at 46.

The larger diameter portions of the semi-cylindrical recesses in the blocks 20, 22 open into semi-annular, dish-shaped recesses 47 in the interfacing end surfaces of the two blocks respectively. These recesses 47 conform in profile to the profile of substantially one half of the outside surface of the respective corrugations to be formed in the wall of the tube blank.

Slidably carried on the guide rods 21 so as to be movable across the surface of the base plate 18, are vanes 50, the rods 21 passing through bores in the vanes. The vanes are rectangular in outside shape and each has a semi-cylindrical recess 51 in its upper edge. This recess, like the larger diameter portions of the recesses 23 and 26 in the blocks 20 and 22 is a close fit on the outside of the tube blank 10. The recesses 51 in the vanes open out into semi-annular dish shaped recesses 53 one in each side face of each vane so as to leave only a narrow constraining rib 54 on the vane to fit against the tube blank. This rib is smoothly rounded where it engages the tube blank and the edges of the recesses 23, 26 are likewise smoothly rounded where they open into the recesses 47. The recesses 53 correspond in shape and dimensions with the recesses 47, the recesses 47 and the recesses 53 together defining a space having a profile of convoluted shape corresponding to the external configuration of the corrugations to be formed in the tube blank when the blocks 20, 22 and the vanes 50 are drawn together to the position shown below the centre line C—C in FIG. 1 of the drawings.

The vanes 50 and the blocks 20, 22 are all interconnected by two series of link means one running along each side of the mandrel. Thus, the block 22 is connected by a pair of links 56, one on each side, to the immediately adjacent vane 50 which is in turn connected to the next adjacent vane 50 by a pair of links 56, the last-mentioned vane being connected to the block 20 by a still further pair of links 56. The link connections are pin and slot connections of which the pins are indicated at 57. The pins are carried by the vanes and blocks and a pair of pins only is associated with each, the adjacent ends of each pair of adjacent links in each series of links having a common pin connection. Each link has a pair of elongated slots 61, 62 the slots 62 being somewhat longer than the slots 61. The slot 61 in one link overlies the slot 62 in another link at each of the intermediate pin and slot connections, the links being flat and somewhat inclined to the horizontal as best shown in the upper part of FIG. 1 of the drawings. The arrangement of the links is such that when the block 20 is moved away from the block 22 against the stop screws 33, the left-hand end of the slots 56 and the right-hand end of the slots 62 as seen in FIG. 1 come into sequential engagement with the pins 57 beginning with the pins 57 associated with the vane next adjacent to the block 20 after the pins 57 on the block 20 have come into engagement with the right-hand end of their slots 62 so that by the time the block 20 engages the stops 33 the vanes 50 and the blocks 20, 22 are equally spaced at a desired spacing pitch along the mandrel.

Hinged at 70 (see also FIG. 2) to the rear of the base assembly plate 18 is a top closure assembly 71. The top closure assembly comprises a plate 72 having at one end an upper sliding block 73 with a stepped semi-cylindrical recess, the block 73 corresponding with the block 20 and being mounted to slide on the undersurface of the plate 72 in a T-slot 74. A guide stud 75 on the block 73 projects above the top surface of the plate 72 and is connected with the piston rod 77 of a double acting compressed air operated ram means 76 of which the cylinder is fixed to the plate 72. The block 73 carries a pair of parallel guide rods 78 which slide in bores in a fixed upper end block 79 at the other end of the plate 72, the block 79 having a stepped semi-cylindrical recess and corresponding with the block 22. At their free ends the rods 78 carry an upper thrust plate 81 corresponding with the thrust plate 38, the plate 81 likewise having a semi-cylindrical recess 83 to embrace the collar 40 between its flanges 41. Mounted to slide on the guide rods 78 between the end blocks 73, 79 and along the undersurface of the plate 72 are further or upper vanes 50 as previously described, the recesses 51 in the upper vanes being in the lower edge of the vanes. These upper vanes 50 and the upper blocks 73, 79 are all interconnected by two series of links 56 as previously described for the first-mentioned or lower vanes 50, the links 56 co-operating with pins 57 on the upper vanes and blocks as before. An upper stop plate 85 mounted on the underside of the plate 72 has stop screws 86 and the block 73 engages the screws 86 in its initial position as shown in FIG. 1 of the drawings.

In this initial position, the block 73 closes squarely on to the block 20 when the top closure 71 is closed (as shown in FIG. 2), the semi-cylindrical recesses 26 in the blocks 20, 73 then co-operating to form a stepped cylindrical bore in the combined blocks, this bore closely embracing one end of the tube blank on the mandrel and the step in the bore engaging behind the collar 16, the smaller diameter part of the bore being a sliding fit on the surface of the mandrel.

In the same way, the block 79 closes squarely on the block 22 the stepped cylindrical bore formed by the semi-cylindrical recesses 23 in the blocks closely embracing the other end of the tube blank on the mandrel and the step in the bore engaging behind the collar 15. The smaller diameter portion of the bore receives the nozzle 35, the end of the mandrel projecting into this smaller diameter portion with clearance.

Also when the top closure is closed, the upper and lower vanes seat together so as to form annular means to restrain the wall of the tube blank completely round its exterior in the mid transverse plane of each pair of upper and lower vanes, and the recess in the upper thrust plate embraces the thrust collar 40. Thus in effect the base plate carries the lower halves of the thrust block means and of the restraining means, and the top closure plate carries the upper halves of such means.

The top closure carries a pair of pressure blocks 87 which close on to locating blocks 89 on the base plate 18. Eye bolts 90 hinged in the blocks 89 may be swung round into slots 91 in the top closure and the top closure then locked down with knobs 92 threaded on to the top of the eye bolts. In its open position as shown in FIG. 1 the top closure rests against stops 94 (see FIG. 2) fixed to the back of hinge pieces 95 on the base plate 18. Referring now to FIG. 3, a compressed air line 100 supplies air under pressure through an air line filter 99 to a self-relieving reducing valve 101 having a gauge 102. The valve 101 supplies compressed air to the nozzle 35 through a supply pipe 104 containing a hand operated control valve 103. A supply pipe 105 communicates with the air line 100 between the filter 99 and the valve 101 to supply a twin pedal foot operated valve 106 having foot pedals 107, 108. When the pedal 108 is depressed, compressed air is supplied through a pipe 110 to the ram means 44 and 76 to move the blocks 20, 73 towards the fixed blocks 22, 79 whereby the vanes and blocks are drawn together to a position as shown below the centre line C—C in FIG. 1 of the drawings. Similarly, when the pedal 107 is depressed, compressed air is supplied through a pipe 117 to the other side of the ram means 44 and 76 to return the blocks 20, 73 to their initial position engaging the stop screws 33 and 86 respectively. On the instroke of the pistons, air is exhausted from the cylinders through the pipe 117 and on the outstroke of the pistons air is exhausted through the pipe 110, the valve 106 communicating the pipe 117 with atmosphere when pipe 110 is conected by the valve to the supply pipe 105 and vice versa.

In operation, a tube blank 10 is positioned on the mandrel with abutment collars 15 and 16 and such mandrel assembly is then positioned in the apparatus in its position as shown in FIG. 1. For this purpose the top closure has to be in an open position and it is assumed that the blocks 20, 73 are in their initial position as above described. The tail stock 30 is adjusted for dropping the mandrel in place and then to locate the respective end onto the nozzle 35. The top closure is then closed. This leaves only the regions of the tube blank wall between and to each side of the ribs 54 free of radial constraint. The hand valve 103 is operated to supply compressed air into the bore 12 and thence to be transmitted through the port 13 to the inside of the tube blank. This air escapes along the surface of the mandrel between the mandrel and the inner surface of the tube so as eventually to emerge through both ends of the tube. This air creates a differential pressure between the inside and the outside of the tube blank. This has the effect of causing small circumferential undulatory swellings to be formed in the unrestrained regions of the tube blank as indicated in chain dotted lines between and to each side of the vane ribs 54 above the centre line C—C in FIG. 1 of the drawings.

Whilst compressed air is being supplied in this way, the pedal 108 is operated. This has the effect of forcing the collar 16 along the mandrel towards the collar 15. The tube blank is accordingly subjected to end pressure causing it to collapse and shorten on the mandrel. The collapse is brought about at the swellings which buckle outwardly, that is to say the swellings contract axially and expand radially into the recesses 53 and 47 to form the required corrugations.

The air valve 103 is then shut off and the top closure assembly is hinged upwards to split open the apparatus, the tube blank being retained in its corrugated condition by the collars 15, 16 which are still held forced together by the base assembly. A hole 120 is provided through the mandrel just behind the collar 16 when the collar is in its final position holding the tube blank corrugated. A retaining pin is inserted through this hole and the mandrel bearing the corrugated tube blank is lifted out of the apparatus. The corrugated tube blank is thereafter vulcanised whilst located on the mandrel.

Whilst the apparatus is still open, the foot pedal 107 is operated and compressed air is supplied to the two ram means to return the blocks 20, 73 to their initial position ready for the insertion of a fresh mandrel assembly carrying a further tube blank into the apparatus.

The end faces of the collars 15, 16 which engage respectively the two ends of a tube blank on the mandrel are undercut with the effect that the end portions of the tube blanks are firmly applied against the mandrel surface by the collars completely around each end of the tube blank when the collars are moved towards one another.

It may be seen from FIG. 1 that in the position of the vanes and blocks holding a tube blank corrugated, a small clearance remains between the vanes and blocks and vanes respectively. Also, in the corrugated condition, the outside surface of the corrugations in the tube substantially exactly fit against the combined surfaces of the recesses 47 in the interfacing end faces of the blocks and the recesses 53 in the side faces of the vanes.

The recesses 47 and 53 are shaped to fit the corrugations that are formed in the tube blank due to its axial collapse and do not impose their shape on the corrugations. They do however act to limit the radial expansion of the swellings which are initially formed in the blank so that all the corrugations which are formed have the same radial dimensions.

When the tube blank is collapsed axially on the mandrel, the vanes 50 are not constrained by the links 56. The vanes float freely between the corrugations formed in the tube blank and are moved by the corrugations themselves to cause them to draw together and towards the fixed end blocks as the tube blank is collapsed into its corrugated form. The swellings buckle outwardly simultaneously as the tube blank collapses and the vanes and blocks consequently draw together simultaneously in concertina fashion. The initial positioning of the vanes is such that the ribs and the rounded edges of the recesses 47 together "mark off" along the tube blank the individual lengths of the blank necessary to form each corrugation.

It follows that if corrugations of different radial extent are required in one tube blank this may be achieved by providing appropriately different spacing between the vanes or vanes and blocks and by varying the radial dimensions of the recesses 47, 53 in accordance with the spacings. In this way a corrugated hose having corrugations at each end which are of smaller diameter than the intermediate corrugations in the hose may be produced.

Instead of providing for manual operation of the compressed air operated ram means and for blowing air into the inside of a tube blank on the mandrel, these ram means may be operated automatically together with a valve controlling the compressed air supply to the inside of the tube, the automatic operation being initiated by closing and opening the top closure of the apparatus.

Another form of the apparatus will now be described with reference to FIGS. 4 to 11. This apparatus is constructed and operates in basically the same manner as above described but presents various modifications.

The base assembly 121 comprises a base plate 122, one end thrust block 123 fixed on the base plate, and another end thrust block 124 located in a slot 125 to slide axially along the plate. Parallel guide rods 126 are secured at one end to the movable block 124 and extend through bores in a series of spaced vane mounting members 127 and through bores in the fixed block 123, and have secured at their other ends a thrust plate 128. This plate co-acts with a thrust collar 129' acted upon by a double-acting fluid-pressure operated ram means 129. Each vane mounting member 127 has detachably secured thereto a vane insert 130 such as by the tongue and groove arrangements 131 locating dowel 132 and locating screw 132', the vane insert presenting half of the annular formation to surround the tube blank. The vane mounting members 127 are urged apart by coil compression springs 133 located on rods 134 which are secured at one end in the fixed block 123 and pass freely through corresponding bores in the vane mounting members and the movable block 124. The fixed block 123 carries an adaptor head 135 which presents a nozzle 136 to mate with the respective end of the mandrel 137 for supply of fluid pressure as above. An adjustable tail stock plunger 138 is carried in a support block 139 fixed on the base plate by way of a series of locating holes 139' for adjustment purposes and urged by a coil compression spring 140 to abut the other end of the mandrel.

Along each side of the base assembly a roller-type link chain 141 interconnects the series of vane mounting members 127 with one set of alternate rollers attached by pins 142 one to each member 127. A beam 143 fixed to the base plate extends parallel with the mandrel axis and carries by way of pivoted parallel links 144 a parallel pressure bar 145 so that the latter is transversely displaceable relative to the mandrel axis and co-acts with the other set of alternate rollers 146. A tension spring 147 acts between the pressure bar and a fixing on the base plate to urge the bar towards the rollers 146, to spread the vane mounting members with equal spacing between the thrust blocks 123 and 124. An adjustable screw stop means 148 acts on the tail stock end of the pressure bar to set the initial open spacing pitch of the vane mounting members, as seen in the lower half of FIG. 5. An adjustable top screw 149 carried by the support block 139 limits return movement of the movable thrust block 124. The adjustments are made such that the end vane mounting members 127H, 127T constantly abut the thrust blocks 123 and 124 respectively.

The top closure assembly 150 comprises a plate 151 hingedly connected to the base assemby by way of hinge pieces 152, 153 and a hinge shaft 154. The plate 151 is rigid with arms 155 which extend to one side of the assembly and present a pivotal connection at 156 for opening and closing of the top closure assembly relative to the base by a double-acting fluid-pressure operated clamp ram means 157. The cylinder of such ram means is carried by a base frame 158 which also carries the base assembly 121. A single-acting fluid-pressure operated ram means 159 is carried on the top closure plate 151 to act directly on a guide block 160 rigid with the upper movable end thrust block 124 corresponding to the lower movable thrust block 124.

Otherwise the construction of the top closure assembly is substantially identical with that of the base assembly, except for the ram means and thrust collar 129, 129', the adaptor head 135 with nozzle 136, and the tail stock means of the base assembly.

The mandrel 137 as shown in FIGS. 4 and 9 comprises a cylinder 162 to which is secured at one end a head plug 163 bored at 164 and countersunk at 165 to mate with the nozzle 136, and an abutment collar 166. A tail plug 167 is secured to the other end of the cylinder, and an abutment collar 168 is slidably mounted on such end. Radial ports 169 extend through the wall of the cylinder, to transmit air pressure from the nozzle 136 to the inside of a tube blank T on the mandrel.

The head and tail end vane inserts 130H and 130T each present to the tube blank a plain semi-cylindrical bore portion 170 to maintain the tube end in its original cylindrical form, and a dished recess portion 171 corresponding to the profile of the respective half of the end corrugation to be formed in the tube wall. These end vane inserts are located in the respective end vane mounting members 127H, 127T and also extend axially to seat in the respective end thrust blocks 123, 124. The end vane inserts receive the abutment collars 166, 168 on the mandrel in the respective bore portions 170. The tail end vane insert presents a shoulder 172 to abut the slidable collar 168, whereby the thrust block 124 acts on the respective end of the tube blank, and a reduced bore portion 173 which is a sliding fit on the mandrel.

In operation, with the top closure assembly opened, a mandrel carrying a tube blank between the abutment collars is dropped into position in the base assembly so that the tail stock urges the head end of the mandrel to mate with the air pressure nozzle 136, the initial open vane pitch spacing and tail end thrust block having been adjusted as required. The top closure assembly is closed onto the base assembly by the clamp ram means 157, which brings the thrust plate 128 of the top assembly into engagement with the thrust collar 129'. Air pressure is then exerted in the interior of the tube blank via the nozzle 136, and the thrust collar 129' is acted on by the base ram means 129 to draw the combined tail end thrust blocks toward the combined head end thrust blocks to a position as shown in the upper half of FIG. 5. The chain link means concertinas with reduction of the opening pitch of the vanes, the pressure bars 145 being displaced away from the mandrel axis against the action of the springs 147. The effect is to corrugate the tube blank as previously described. The clamp ram means then opens the top assembly, a retaining pin is inserted into the mandrel behind the slidable abutment collar 168, e.g. into one of the ports 169, to hold the tube in its corrugated form, and such mandrel assembly with corrugated tube is removed for vulcanising. The base ram means 130 then acts to return the respective tail end thrust block to the initial position, and the inter-vane springs 133 urge the vanes apart to their initial open spacing, with assistance from the pressure bar springs 147. The top assembly being opened, the top ram means 159 acts similarly for such assembly.

The apparatus can be readily adapted for shorter lengths of tube blank. FIG. 10 illustrates a modified mandrel arrangement utilising a shorter mandrel 137S. The head end arrangement of the vane inserts 130, 130H is as before. Also tail end vane inserts 130TS co-act with the tail end of the mandrel substantially as before. However, correspondingly fewer vanes have to be used, assuming the blank is of the same or similar bore. Thus the tail end insert 130TS will be located in an intermediate vane mounting member 127. Longitudinal spacing means 174 has fixed thereto at the forward end of the insert 130TS and at the rearward end a supplementary insert 175 to be located in the tail end mounting member 127T, to be acted on by the tail end thrust blocks 124. No vane inserts will be located in vane mounting members remaining between the inserts 130TS and 175. A tail stock extension bar 176 will be screw-threaded into a hole 177 in the tail stock plunger to co-act with the tail end of the shorter mandrel, such extension bar being supported in collar means 178 carried by the spacing means. Thus the interchangeable mandrel and restraining means are adapted to accommodate different lengths of tube.

FIG. 7 illustrates the use of alternative vane inserts such as 130A to present smaller bore recesses as at 179 to accommodate tubes of different bores. The mandrel will be selected of a diameter appropriate to the tube. Thus the mandrel and restraining means are also interchangeable to accommodate tubes of different bores. FIG. 7 also shows an upper vane mounting member 127 prior to location therein of a vane insert. The initial open pitch spacing of the vanes has to be set proportional to the bore of the tube blank, that is the larger the bore the coarser the initial pitch spacing.

FIG. 11 illustrates a pneumatic circuit for controlling such apparatus. A compressed air line 180 supplies air under pressure via a filter unit 181, a pressure reducing valve 182 and a "blow hose" control valve 183 to the nozzle 135. A supply line 184 from up-stream of the valve 182 passes to a reversing valve 185 set in one sense by two "clamp" control valves 186, 187 in series, and in the other sense by an "unclamp" control valve 188. Lines 189 and 190 extend from the reversing valve to the double-acting clamp ram means 157 which acts to clamp or unclamp the top closure assembly to the base assembly according to such setting of the reversing valve. With the reversing valve set to clamp the top closure assembly, the line 189 can supply pressure air via a "convolute" control valve 191 to one end of the base ram means 129, to corrugate the tube. With the reversing valve set to unclamp the top closure assembly the line 190 can supply pressure air via an "open convolute" control valve 192 to the other end of the base ram means 129 and to the working cylinder end of the top ram means 159 to return the movable thrust block means and vanes to their initial open position. A filter 193 connects the other cylinder end of the top ram means 159 to atmosphere. The reversing valve 185 connects to atmosphere at 194 and 195 according to its setting. The control valves as illustrated are push-button operated, but they may be automatically operated in desired time sequence.

In both of the embodiments described, in order to prevent collapse, i.e. sucking together, of the walls of the tube corrugations during vulcanisation on the mandrel, a fine groove (not shown) is provided running along the surface of the mandrel parallel with the axis of the mandrel for the full length of the mandrel, the groove intersecting and communicating with the port or ports in the mandrel surface. This groove prevents any vacuum or partial vacuum being created inside the corrugations during vulcanisation and thus the collapse of the corrugations.

The invention is applicable generally to the manufacture of corrugated or convoluted hose. The invention is however particularly useful for manufacturing such hose wherein the hose wall is reinforced. For example, the tube blank may include an intermediate reinforcing sleeve embedded in the rubber wall. This sleeve may be a circular, knitted sleeve for example.

It will readily be appreciated that by increasing the number of vanes and extending the length of the apparatus, longer lengths of hose having many more corrugations may be produced. If desired, intermediate blocks having an axial extent equal to say the blocks at the ends may be provided in the series of blocks and vanes interconnected by the links, these intermediate blocks sliding on the guide bars and having recesses of plain semi-cylindrical shape to fit closely against the tube blank and thereby radially restrain its wall over a substantial intermediate part of its length. The final hose may then be parted off in these regions so as to produce a plurality of corrugated hoses of shorter length.

The term "rubber" as used herein is to be taken to include both natural and synthetic rubbers and also vulcanisable rubber-like compositions.

I claim:

1. Apparatus for manufacturing corrugated hose, comprising a mandrel to internally support a rubber tube blank; abutments on the mandrel to engage respectively the two ends of a tube blank positioned on the mandrel, one of the abutments being fixed and the other movable there-towards; means to support the mandrel; means to restrain around its exterior at spaced transverse planes along its length a tube blank positioned on the supported mandrel, a separate restraining means being provided to restrain the tube at each of said planes and such restraining means being movable axially relative to the mandrel so as to draw closer together; an annular thrust block means co-acting with each of the two abutments on the supported mandrel whereby to exert end pressure on the tube, such thrust block means and the restraining means being split in an axial plane in halves; a base assembly plate carrying lower halves of the thrust block means and of the restraining means; a top closure assembly plate hingedly connected to the base plate and carrying upper halves of the thrust block means and of the restraining means for separation from said lower halves to receive the mandrel in the support means, one thrust block means being fixed relative to the plates and co-acting with the fixed abutment on the mandrel, the other thrust block means being axially slidable relative to the plates and to act on the movable abutment on the mandrel, and the restraining means being axially slidable relative to the plates; link means interconnecting the restraining means to set the restraining means at an initial spacing pitch between the thrust block means; on each of such base and top closure assemblies parallel guide rods secured at one end to the movable thrust block means and slidable axially in corresponding bores through the restraining means and the fixed thrust block means; thrust plates secured at the other end of the guide rods one thrust plate on each of the base and top closure assemblies; a thrust collar co-acting with both such thrust plates in the closed position of the assemblies; a first fluid-pressure operated ram means acting on the thrust collar to advance the movable thrust block means and mandrel abutment towards the fixed thrust block means and mandrel abutment; means to supply a differential pressure of fluid between the interior and exterior of a tube blank positioned on the supported mandrel to produce circumferential undulatory swellings in the wall of the tube between the restraining means; and means to hold the movable abutment in an advanced position.

2. Apparatus according to claim 1 wherein said first ram means is carried on the base assembly and a second fluid-pressure operated ram means carried on the top closure assembly acts directly on the movable thrust block means.

3. Apparatus according to claim 1 wherein each separate restraining means comprises two vane mounting members one on each of the base and top closure assemblies and bored to receive the respective parallel guide bars, and two vane inserts detachably secured one in each mounting member to present an annular formation surrounding the tube in the closed position of the assemblies.

4. Apparatus for manufacturing corrugated hose, comprising a mandrel to internally support a rubber tube blank; abutments on the mandrel to engage respectively the two ends of a tube blank positioned on the mandrel, one of the abutments being fixed and the other movable there-towards; means to support the mandrel; means to restrain around its exterior at spaced transverse planes along its length a tube blank positioned on the supported mandrel, a separate restraining means being provided to restrain the tube at each of said planes and such restraining means being movable axially relative to the mandrel so as to draw closer together; an annular thrust block means co-acting with each of the two abutments on the supported mandrel whereby to exert end pressure on the tube, such thrust block means and the restraining means being split in an axial plane in halves; a base assembly plate carrying lower halves of the thrust block means and of the restraining means; a top closure assembly plate hingedly connected to the base plate and carrying upper halves of the thrust block means and of the restraining means for separation from said lower halves to receive the mandrel in the support means, one thrust block means being fixed relative to the plates and co-acting with the fixed abutment on the mandrel, the other thrust block means being axially slidable relative to the plates and to act on the movable abutment on the mandrel, and the restraining means being axially slidable relative to the plates; link means interconnecting the restraining means to set the restraining means at an initial spacing pitch between the thrust block means; means to supply a differential pressure of fluid between the interior and exterior of a tube blank positioned on the supported mandrel to produce circumferential undulatory swellings in the wall of the tube between the restraining means, the mandrel support means including an adaptor head which is located on the fixed thrust block means and which presents a nozzle to mate with the respective end of the mandrel and supply the fluid pressure to within the mandrel for transmission to the interior of a tube blank, on the mandrel, and an adjustable tail stock; and means to hold the movable abutment in an advanced position.

5. Apparatus for manufacturing corrugated hose, comprising a mandrel to internally support a rubber tube blank; abutments on the mandrel to engage respectively the two ends of a tube blank positioned on the mandrel, one of the abutments being movable towards the other; means to support the mandrel a series of separate restraining means spaced axially along the length of a supported mandrel to surround a tube on the mandrel and restrain the tube at spaced transverse planes along its length, such restraining means being movable axially relative to the mandrel so as to draw closer together; means to advance said movable abutment towards said other abutment; means to set such series of restraining means at an initial spacing pitch which is reduced as the abutments are moved relatively the one towards the other until the pitch of the restraining means corresponds with the desired pitch of the tube corrugations, including roller type chain link means interconnecting the series of restraining means with one set of alternate rollers attached one to each restraining means, a pressure bar parallel with the mandrel axis being transversely displaceable relative to said axis and co-acting with the other set of alternate rollers, spring means urging the bar towards said rollers, and adjustable stop means limiting the displacement of the bar towards the rollers to set the initial spacing pitch of the restraining means, the bar being displaced against the spring action away from the mandrel axis as the link means is concertina'd with reduction of the spacing pitch of the restraining means during operation; means to supply a differential pressure of fluid between the interior and exterior of a tube blank positioned on the supported mandrel to produce circumferential undulatory swellings in the wall of the tube between the restraining means; and means to hold said movable abutment in an advanced position.

6. Apparatus for manufacturing corrugated rubber hose, comprising a mandrel to internally support a rubber tube blank; abutments on the mandrel to engage respectively the two ends of a tube blank positioned on the mandrel, one of the abutments being movable towards the other; means to support the mandrel; a series of separate annular vanes spaced axially along the length of a supported mandrel to surround a tube on the mandrel and restrain the tube at spaced transverse planes along its length each vane presenting to a tube on the supported mandrel a profile substantially corresponding to a respective portion of the external configuration of the corrugations to be formed in the tube, and such vanes being movable axially of the mandrel, means to supply a differential pressure of fluid between the interior and exterior of a tube blank positioned on the supported mandrel to produce circumferential undulatory swellings in the wall of the tube between the vanes; annular thrust block means co-acting with the abutments on the supported mandrel whereby to exert end pressure on the tube and advance said movable abutment towards said other abutment, such thrust block means and the vanes being split in an axial plane in halves for separation to receive and remove the mandrel relative to the support means; link means associated with each of the respective halves of the thrust block means and vanes and interconnecting the vane halves to set them at an initial spacing pitch between the thrust block means but allow them to move axially so as to be drawable closer together by entrainment with the radially expanding and axially contracting tube with each vane half floating freely of the other vane halves to present a combined profile substantially completely fitting the required corrugated form of the tube and so exactly limiting the radial expansion thereof; and means to hold said movable abutment in advanced position.

References Cited

UNITED STATES PATENTS

| | | | |
|---|---|---|---|
| 2,306,018 | 12/1942 | Fentress. | |
| 2,866,230 | 12/1958 | Holte | 18—19 |
| 2,897,840 | 8/1959 | Roberts et al. | |
| 2,616,129 | 11/1952 | Burton et al. | 264—89 |
| 3,076,228 | 2/1963 | Johnson | 18—191 |
| 3,168,604 | 2/1965 | Krammer et al. | |

ROBERT F. WHITE, *Primary Examiner.*

A. R. NOË, *Assistant Examiner.*